3,826,790
SOLUTION POLYMERIZATION PROCESS
Servaas van der Ven, 252 Evesham Road,
Cherry Hill, N.J. 08003
No Drawing. Filed Sept. 25, 1972, Ser. No. 292,027
Claims priority, application Netherlands, Jan. 21, 1972,
7200923
Int. Cl. C08d 1/20, 3/04, 3/08
U.S. Cl. 260—94.2 M                               5 Claims

ABSTRACT OF THE DISCLOSURE

A process for the polymerization of conjugated dienes optionally with monovinyl aromatic hydrocarbons to polymers having increased cis 1,4 content, which comprises polymerizing at least one conjugated diene in the presence of an initiator formed by reacting a hydrocarbon soluble lithium alkyl and a hydrocarbon soluble trihydrocarbyl boron compound in the presence of at least one conjugated diene or monovinyl hydrocarbon and maintaining during polymerization the ratio of boron to lithium of at least 0.5.

BACKGROUND OF THE INVENTION

The invention relates to a process for the polymerization of one or more conjugated dienes, optionally with one or more mono-vinylaromatic hydrocarbons, in the presence of a liquid diluent in which the polymer is formed in the dissolved state. More particularly the invention relates to a polymerization process using as initiator a combination of a hydrocarbyllithium compound (a), and a trihydrocarbylboron compound (b), both compounds being completely soluble in the diluent in the applied concentrations and at the polymerization temperature, said compounds (a) and (b) being contacted with each other in the presence of at least one of the monomers mentioned. The invention also relates to vulcanized products prepared by vulcanization of polymers that have been obtained by application of said process.

U.S. 3,278,508 describes a process for the preparation of homopolymers of conjugated dienes, such as butadiene and isoprene, or of copolymers of two or more conjugated dienes, or of one or more conjugated dienes with, among other compounds, vinylaromatic hydrocarbons. This process, which is preferably performed in a liquid hydrocarbon as diluent, employs an organolithium compound as initiator together with another metal compound as adjuvant material. This adjuvant material serves to reduce the inherent viscosity of the polymer, without considerably altering the polymer structure. As appears from the examples, the initiator and the adjuvant material are brought into contact with each other in the presence of the monomer.

As initiators in U.S. 3,278,508, organolithium compounds such as hydrocarbyllithium compounds with one or more lithium atoms are mentioned, but the representatives mentioned are all insoluble in hydrocarbon diluents so also in the medium in which the polymerization takes place. Among the representatives of the adjuvants are metal compounds including a number of trihydrocarbylboron compounds that do dissolve in hydrocarbons, such as for instance triethylboron and tri-n-butylboron. A specific objective is to prepare easily processable polymers containing a high percentage of cis-1,4-addition product.

According to said U.S. patent the quantity of metal compound applied as adjuvant material is generally chosen in such a way that the atomic ratio of the lithium in the organolithium compound to the metal in the adjuvant material is 1 to 100. This means that if a trihydrocarbylboron compound is used as the adjuvant material, the ratio of the boron concentration in gram atoms/liter (gat./l.) in the reaction mixture at the end of the polymerization to the lithium concentration in gat./l. in the reaction mixture at the end of the polymerization is between 0.01 and 1.00. It is further mentioned that it has been tried to prepare an isoprene polymer of maximum cis-1,4-content and with an inherent viscosity that lies in the desired range by choosing the mentioned atomic ratio Li/B relatively high, for instance at least 5/1 and preferably 10/1 or higher. Said ratio in terms of the B/Li concentration ratio specified herein is here consequently lower than 0.2 and preferably lower than 0.1.

Example I of said U.S. 3,278,508 clearly shows that if under otherwise similar conditions the B/Li ratio increases beyond 0.06, results in decreasing not only the inherent viscosity and consequently the average molecular weight, but also the cis-content of the polymer. So, under the experimental conditions described the cis-content depends upon the boron concentration.

The initiator used in these experiments was lithium-methyl-naphthalene or lithiumdihydroanthracene, which compounds (as said already) are both insoluble in the polymerization medium applied and which on the basis of the other experimental data must have contained two lithium atoms per molecule. The experimental data given also show that in these experiments the smallest difference between the lithium concentration and the boron concentration has amounted to about $$1.2 \times 10^{-3} (=120 \times 10^{-5})$$

gat./l. (Examples II and IV).

It has now been found that with the aid of compounds (a) and (b) it is possible to prepare a polymer that can have a previously chosen inherent viscosity of any desired value, while nevertheless the cis-content is invariably higher than the cis-content of a polymer having the same value for the inherent viscosity, but which has been prepared with the aid of exclusively compound (a) as initiator (consequently without the aid of adjuvant material (b)).

The invention therefore relates to a process for the preparation of a conjugated diene polymer having an increased cis-content for any given average molecular weight. Further, with this process, said average molecular weight is independent of the quantity of trihydrocarbyl boron compound (b) employed. Moreover, the cis-content is also even higher than the cis-content of a polymer that has the same inherent viscosity, but that has been prepared under the conditions of the experiments of the U.S. 3,278,508 described hereinbefore.

According to the invention these results can be obtained if as compound (a) a hydrocarbyllithium compound is used that in the total concentration applied at the polymerization temperature is completely soluble in the diluent and if furthermore a number of criteria are met as to the lithium concentration and the boron concentration. In the specification of these criteria given hereinafter the following designations are used.

[B(f)], represents the boron concentration in the reaction mixture at the end of the polymerization; as will be explained in more detail in the following, during the polymerization this boron is present in the form of a complex that also contains part of the lithium, which consequently is in an inactive form; the B/Li atomic ratio in this complex is 1:1;

[Li(f)], represents the total lithium concentration in the reaction mixture at the end of the polymerization, but reduced by the minimum lithium concentration that is needed in the reaction medium in the absence of a boron compound to initiate the polymerization; the minimum concentration mentioned here is the initiation concentration and therefore corresponds to that quantity of lithium which is consumed before the start of the polymerization by reaction of contaminants present in the monomer feed, in so far as these react more rapidly with the initiator (a) than the monomer, which reaction yields lithium compounds which are permanently inactive for initiator; and

[Li(c)], represents the increase of the lithium concentration in so far as this is applied to compensate to a maximum of 100 percent for the quantity of lithium that is permanently deactivated during the polymerization by reaction with the contaminants present in the monomer feed; this permanent deactivation is caused by contaminants reacting so slowly with the lithium that this reaction still continues after the polymerization has been initiated or only starts to occur during the polymerization.

So, the magnitude of [Li(c)] depends on the quality of the monomer feed and on the applied percentage of the compensation mentioned hereinbefore. The value for [Li(c)] can be determined as follows:

With a feed that does not show signs of die-out during the polymerization, for instance a feed from which the contaminants that are responsible for die-out have been removed by treatment with sodium, some polymerization runs are carried out with the aid of the present hydrocarbyllithium compound, but without application of a boron compound. Each run is carried out at a different temperature and each polymerization of the same run invariably at the same temperature, but at a different lithium concentration. However, the lithium concentration is always chosen within the range of from $0.5 \times 10^{-5}$ to $10 \times 10^{-5}$ gat./l. (in agreement with the criterion mentioned hereinafter for [Li(f)]-[Li(c)]-[B(f)]).

So, in this polymerization [Li(c)] and the boron concentration [B] are equal to zero, while at any moment the lithium concentration [Li] is the concentration of the active lithium, which will be denoted by [Li(a)]. As [Li(a)] remains constant during these polymerizations, the final value for [Li(a)] (denoted by [Li(a)(f)]) is equal to [Li(f)].

In each of the polymerizations mentioned the changes in the monomer concentration in the liquid phase with time are checked via conventional methods such as e.g. gas-liquid chromatography (GLC) of the gas phase or via solids determinations. If $[M]_{t_1}$ and $[M]_{t_2}$ represent the monomer concentrations in the liquid phase at time $t_1$ and $t_2$, respectively as from the time the polymerization is started, the polymerization ratio constant $k$ can be calculated from the formula:

$$\ln\ ([M]t_1 : [M]t_2 = k(t_2 - t_1).$$

The $k$ value thus calculated may conveniently be incorporated in a graph in which these values for each of the polymerization temperatures applied are plotted against the lithium concentrations applied, which may consequently—as desired—be denoted by [Li(a)] or by [Li(f)].

As in the process according to the invention the atomic ratio B/Li in the complex mentioned hereinbefore is 1:1, this graph also applies to polymerizations according to the invention, provided that they are carried out with the above-mentioned feeds and that for lithium concentration is read [Li]-[B] or [Li(f)]-[B(f)].

In the experiments that are carried out using trihydrocarbyl-boron according to the invention and in which the feeds often cause, to a greater or lesser extent, die-out of the living polymer, part of the lithium (as mentioned before) occurs in a complexed form and is consequently inactive. So, here [Li(a)] is not equal to [Li] and, as a rule, not equal to ([Li]-[B]) either. The magnitude of the difference between [Li(a)] and ([Li]-[B]) depends on the quality of the feed. Now in these polymerizations the monomer concentration in the liquid phase is regularly determined, for instance once every 5 to 10 minutes, according to one of the methods mentioned before, and from this the corresponding value for $k$ is again calculated with the formula mentioned hereinbefore. As soon as a value for $k$ has been calculated, the corresponding concentration of non-complexed active lithium, so [Li(a)] can be read from the above graph as well as its difference with the [Li(a)] aimed at (that goes with the $k$ aimed at).

So, this difference represents the loss of active lithium that has occurred during the polymerization after a certain period of polymerization as a result of reaction with slowly reacting contaminants. From this loss the extra quantity of hydrocarbyllithium can be calculated that has to be added at that moment as a compensation. As a rule this quantity will be chosen at such a level that it will cause the value for [Li(a)] to increase beyond the value aimed at, while a new additional quantity will not be added before the [Li(a)] has fallen below the value aimed at. In this way [Li(a)] can be caused to fluctuate between values that lie for instance, between 85 percent above and 85 percent below the value aimed at. It is not necessary that for each addition [Li(a)] increases or decreases by the same amount. It is preferable, however, to choose these increases and decreases smaller, to effect them as rapidly as possible after one another and to cause the increases and decreases to differ as little as possible. The sum of the extra quantities of initiator thus added, in so far as they do not exceed a compensation of 100 percent, is not by definition equal to the value for [Li(c)].

Furthermore, by "[Li(a)] attained" is understood that concentration of active lithium which, in a system without boron, would lead to the same mean polymerization rate. The final [Li(a)] value, which will be termed "[Li(a)(f)] attained," can then be determined afterwards via the average value of the $k$-values calculated from the monomer concentrations.

The percentage of compensation attained at the end of the polymerization is equal to $100 \times ([Li(a)(f)]$ attained: [Li(a)] aimed at), provided that [Li(c)] is greater than zero, (naturally, at [Li(c)]=0 no compensation at all is applied).

The concentration criteria that must be met in the process according to the invention are:

[Li(f)]-[Li(c)] must lie between $10^{-5}$ and $10^{-1}$ gat./l. preferably between $10^{-5}$ and $10^{-2}$ gat./l,

[Li(f)]-[Li(c)]-[B(f)] must have a value of from $0.5 \times 10^{-5}$ to $10 \times 10^{-5}$ and preferably lie between $0.5 \times 10^{-5}$ and $5 \times 10^{-5}$ gat./l. and

[B(f)]:([Li(f)]-[Li(c)]) must be greater than 0.5, preferably greater than 0.8.

The invention can therefore be defined as relating to a process for the polymerization of at least one conjugated diene, optionally together with at least one mono-vinylaromatic hydrocarbon, in the presence of a liquid hydrocarbon diluent, in which the polymer is formed in the dissolved state, using a hydrocarbyllithium compound (a), and a trihydrocarbylboron compound (b) that is completely soluble in the diluent in the concentration applied at the polymerization temperature, in which process (a) and (b) are contacted in the presence of at least one conjugated diene or a vinylaromatic hydrocarbon, the ratio of the boron concentration [B(f)] in gat./l. to the lithium concentration [Li(f)] in gat./l. is higher than 0.01 and lower than 1.00, these terms representing the concentrations in the reaction mixture at the end of the polymerization, but in the case of the lithium concentration reduced by the minimum lithium concentration that is needed in the reaction medium in the absence of a boron compound to initiate the polymerization, and with the proviso that (1) component (a) is completely soluble in the diluent in the total concentration applied at the polymerization temperature, and (2) where [Li(c)] represents the increase of the lithium concentration applied to compensate to a maximum of 100 percent for the quantity of lithium that is permanently deactivated during the polymerization as a result of reaction with the contaminants present in the feed,
the difference [Li(f)]-[Li(c)] lies between $10^{-5}$ and $10^{-1}$ gat./l.
the difference [Li(f)]-[Li(c)]-[B(f)] has a value of from $0.5 \times 10^{-5}$ to $10 \times 10^{-5}$ gat./l. and
the ratio [B(f)]: ([Li(f)]-[Li(c)]) is higher than 0.5.

The polymerization is preferably started by first contacting the monomer or at least one of the monomers with a quantity of (b) and subsequently adding a quantity of (a) that is greater than the quantity which is equivalent to the quantity of (b). Application of equivalent quantities of (a) and (b) means that the number of atoms of lithium present in the quantity of (a) is equal to the number of atoms of boron present in the quantity of (b). It is also possible to reverse the sequence in which (a) and (b) are added, i.e. first contacting the monomer with (a) and after that adding (b), but it will then be necessary to apply a low temperature to prevent that the monomer is already substantially polymerized before (b) is added. As a rule the concentration difference [a]-[b] will correspond to a lithium concentration of from $0.5 \times 10^{-5}$ to $10 \times 10^{-5}$ gat./l. increased by the initiation concentration.

Another method of starting that can be carried out more rapidly and which is therefore preferred even more is that by which the monomer or the monomers is, or are, brought into contact with a pre-mixture prepared by reacting a quantity of (a) in the presence of a liquid hydrocarbon diluent with a conjugated diene and/or monovinylaromatic hydrocarbon, and subsequently adding a quantity of (b) that is at most equivalent to the quantity of (a). If the quantity of (b) is equivalent to the quantity of (a), the monomer or the monomers must be brought into contact with an additional quantity of (a). As a rule this additional quantity of (a) will in this case, too, correspond to a lithium concentration of from $0.5 \times 10^{-5}$ to $10 \times 10^{-5}$ gat./l., increased by the initiation concentration with respect to the equivalent quantity, the difference [a]-[b] will usually again correspond to a lithium concentration in the range of from $0.5 \times 10^{-5}$ to $10 \times 10^{-5}$ gat./l. increased by the initiation concentration, after which, naturally, no further additional quantity of (a) need be added.

In the preparation carried out beforehand, of the mixture described hereinbefore, the first occurring reaction of the conjugated diene and/or the vinylaromatic hydrocarbon with compound (a) is preferably effected by applying per mole of (a) at least one mole of diene and/or vinylaromatic and a hydrocarbon conversion of at least 95 percent. As a rule this conversion will amount to 100 percent and the conjugated diene or vinylaromatic or a mixture thereof taking part in the reaction will be converted into a living polymer with a low average molecular weight.

By addition of (b) this living polymer is subsequently wholly or partly complexed to a compound containing boron and lithium in the atomic ratio of 1:1, which is as a result inactive with respect to the polymerization. If for instance compound (a) is sec-butyllithium (sec-BuLi), compound (b) triethylboron (BEt$_3$) and the hydrocarbon participating in the reaction isoprene, the complex thus formed beforehand can be represented by the formula

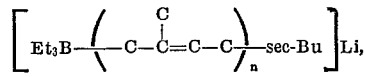

in which $n$ is at least 1.

It is assumed that such a complex is also formed before the polymerization is started, unless in this process a mixture is applied which has been prepared beforehand separately from BEt$_3$, isoprene and sec-BuLi. Complex formation will then presumably occur as soon as the BEt$_3$, in the presence of an isoprene feed, is brought into contact with sec-BuLi.

The polymerization starts when in addition to complexed sec-BuLi also non-complexed active (free) sec-BuLi is present. During the polymerization exchange takes place of the group

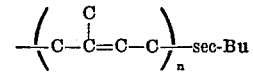

with the living polymers chains, which are bound to the lithium atoms originating from the free sec-BuLi, so the sec-BuLi that has been applied in excess with respect to the quantity required for complex formation and that has not become inactive through the action of contaminants. These polymer chains can be represented by the formula

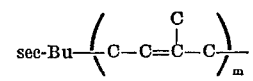

in which $m$ is also at least 1.

The exchange reaction can then be assumed to take place according to the following reaction scheme:

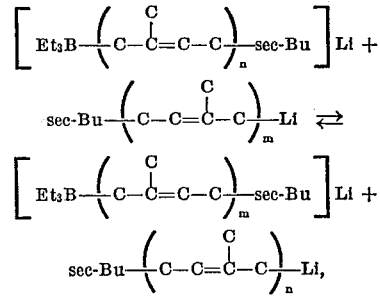

in which the chains

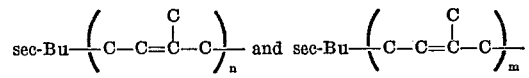

can both grow, but only alternately and at moments when they are in the non-complexed state. If isoprene is replaced by for instance butadiene or styrene or by a mixture of two or more of the monomers mentioned, similar reactions then take place. In the case of styrene for instance

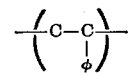

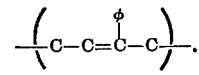

In order to obtain in the actual polymerization end products with a broadened molecular weight distribution, it is to be recommended that, after during this polymerization a monomer conversion of at least 10 percent and preferably a conversion between 20 and 80 percent has been reached, the boron concentration as well as the lithium concentration be increased once or several times. These increases are then effected either by one or more additions of (b) and of (a), in which each addition of (b) is followed by addition of an equivalent quantity of (a), or by one or more additions of a mixture that has been prepared separately beforehand in one of the ways described hereinbefore and in which a preparation using a quantity of (b) that is equivalent to the quantity of (a) applied is preferred.

The increase of the boron and the lithium concentration just described will preferably be effected only once, namely a monomer conversion between 10 and about 60 percent. In doing so the ratio $$([Li(f)]-[Li(c)]):([Li(f^1)]-[Li(c^1)])$$

will be chosen between 1 and 100 and preferably between 5 and 50. In this ratio ($f^1$) and ($c^1$) denote that the concentrations concerned only relate to the period before the concentration increase, i.e. stage 1. They have otherwise the same meaning as (f) and (c). In so far as the term $[Li(a)(F^1)]$ occurs in this means the concentration of active lithium at the end of stage 1.

Another way to attain an improvement of the molecular weight distribution, or a further improvement thereof, is to add during the polymerization proper, after a monomer conversion of at least 75 percent has been reached, a coupling agent to the polymerizing system. The subsequent coupling reaction results, in addition, in an improvement of the cold flow. Very suitable coupling agents are, for instance, neutral bivalent or polyvalent esters of dibasic or polybasic carboxylic acids, such as described in U.S. 3,551,392 to Snyder et al.

The liquid hydrocarbon diluents applied in the process according to the invention include alkanes, monoalkenes, and aromatics of 4 to 8 carbon atoms and mixtures thereof. As representatives of these can be mentioned benzene, toluene, cyclohexane, methylcyclohexane, xylene, n-butane, n-hexane, n-pentane, n-heptane, isooctane, 1-pentane, 2-pentane, 3-methyl-1-butane, 3-methyl-2-butene or mixtures of two or more of these compounds.

As conjugated dienes are preferably aliphatic conjugated dienes having 4 to 6 carbon atoms such as e.g. 1,3-butadiene, isoprene, 1,3-pentadiene (piperylene). Isoprene is most preferred. The preferred mono-vinylaromatic hydrocarbons have 8 to 12 carbon atoms; exemplary are styrene, alpha-methylstyrene and p-tert-butylstyrene. Styrene is most preferred.

Suitable hydrocarbyllithium compounds are the lithium alkyls having 4 to 8 carbon atoms, such as for example n-butyl-lithium, sec-butyllithium, tert-butyllithium and n-octyllithium.

Examples of trihydrocarbylboron compounds which may be employed have hydrocarbyl groups of 2 to 6 carbon atoms. The hydrocarbyl groups which may be aryl are preferably alkyl. Exemplary are triethylboron, tri-n-butylboron, triphenylboron, of which triethylboron is most preferred.

The process according to the invention can also be carried out continuously, preference then is being given to the use of the separately prepared pre-mixture of (a) and monomer described hereinbefore, to which mixture a quantity of (b) has been added that is equivalent to the quantity of (a) applied in this mixture.

EXAMPLE I

A number of experiments were carried out in an autoclave with a capacity of 25 liters which was filled with 15 liters of a feed which is under its own vapor pressure, consisting of a 20 percent w. solution of isoprene in a mixture of alkanes and alkenes having 5 carbon atoms. After the contents of the autoclave had been brought to the polymerization temperature, a certain quantity of an 0.1 molar solution of triethylboron in isooctane was added. Subsequently a 0.1 molar solution of sec-butyllithium in isooctane was added in portions amounting to only 1/20 of the quantity of $BEt_3$ added. The addition (titration) was continued till a temperature increase of some tenths of a degree centigrade could be observed. At that moment a small additional quantity of the sec-butyllithium solution was added, resulting in initiation of the polymerization. During the polymerization the monomer concentration in the liquid phase was monitored by gas-liquid chromatography of the gas phase at time intervals of about 10 minutes. As soon as the polymerization rate constant calculated therefrom showed a decline, the loss of active lithium to be compensated for was determined as described earlier. The compensation was carried out by adding a small quantity (0.005 to 0.01 mole) of sec-butyllithium one or more times as needed. The polymerization was ended by addition of a quantity of methanol somewhat greater than the quantity that is equivalent to the total quantity of still active lithium present. The polymer was worked up by addition of 4-hydroxy-methyl-2,6-di-tert-butylphenol as antioxidant, steam-stripping and drying.

In table A have been compiled: the boron concentration at the end of the polymerization, [B(f)] (this concentration is practically equal to the boron concentration at the moment of addition), the lithium concentration at the end of the polymerization, [Li(f)], which concentration has been corrected for the concentration in the feed at initiation determined separately. The increase of the lithium concentration applied during the polymerization, [Li(c)], and serving to compensate for reductions in the rate of polymerization, the [Li(a)] aimed at and the [Li(a)(f)] attained, the percentage of compensation attained, the difference [Li(f)]-[Li(c)], the difference [Li(f)]-[Li(c)]-[B(f)], the ratio $$[B(f)]:([Li(f)]-[Li(c)])$$

the polymerization temperature, the polymerization time, the monomer conversion, as well as the LVN (in toluene at 25° C.), the cis-content and the trans-content of the resulting polymer. The cis-contents and the trans-contents were determined by means of nuclear magnetic resonance (NMR).

Since the examples I, II, IV and V of the U.S. 3,278,508 give two kinds of cis-contents, vis "raw" and "normalized," these cis-contents must have been determined by a method other than NMR (presumably infra-red analysis). In addition, these examples do not mention the trans-contents. Therefore, the polyisoprene-cis-values from the said patent are not comparable with the NMR values given in the present examples.

The experiments Nos. 1 to 13 have been carried out according to the invention. Of these experiments Nos. 1 to 10 have been carried out under preferred conditions. For comparison Experiments 14 to 18 have been included in Table A not according to this invention. In experiments 14 to 16 triethyl boron and sec-butyllithium were both applied, but the difference [Li(f)]-[Li(c)]-[B(f)] was greater than $10 \times 10^{-5}$, while in addition, in experiment 15 the ratio [B(f)]:[Li(f)]-[Li(c)]) was smaller than 0.5. The experiments 17 and 18 were conducted with sec-butyllithium without $BEt_3$. In experiments 10 and 12 to 18 the polymerization temperature was lower than in the other experiments (40° C. instead of 60° C.); this was necessary in view of the higher values for [Li(f)]-[Li(c)]-[B(f)]. In Table B a comparison has been made between the NMR-cis-contents found in experiments 1 to 10 and the NMR-cis-contents of the polymers obtained in experiments 11 to 18; the comparison invariably related to cis-contents of polymers having about equal LVN-values and obtained at about equal values for [Li(f)]-[Li(c)]. Also, the NMR cis-contents in experiments 1 to 16 are compared with the NMR cis-contents of polymers prepared without boron compound but at the same value for [Li(f)]-[Li(c)].

TABLE A

|  | According to the invention ||||||||||||| Not according to the invention ||||
|  | Preference |||||||||| No preference ||| With BR$_3$ || Without BR$_3$ ||
| Experiment number | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| [B(f)], gat./l. × 10$^5$ | 5 | 5 | 7.5 | 10 | 15 | 20 | 30 | 40 | 40 | 40 | 4 | 6 | 12 | 13 | 8 | 26 | 0 | 0 |
| [Li(f)], gat./l. × 10$^5$ | 7 | 7 | 10 | 11 | 19 | 23 | 33 | 42 | 44 | 44 | 6 | 10 | 15 | 25 | 25 | 40 | 25 | 40 |
| [Li(c)], gat./l. × 10$^5$ | 3×½ | 2×½ | 3×½ | 0 | 3×1 | 2×1 | 2×1 | 1 | 2×1 | 0 | 1 | 0 | 0 | 0 | 0 | 0 | 0 | 0 |
| [Li(a)] aimed at, gat./l. × 10$^5$ | 1 | 1 | 1 | 1 | 1 | 1 | 1 | 1 | 1 | 2 | 1 | 1 | 3 | 12 | 17 | 14 | 25 | 40 |
| [Li(a)(f)] attained, gat./l. × 10$^5$ | 0.6 | 0.8 | 0.8 | 1 | 0.8 | 1 | 0.8 | 0.8 | 1.5 | 4 | 1 | 4 | 3 | 12 | 17 | 14 | 25 | 40 |
| Attained compensation of permanently deactivated Li, during polymerization, percent | 60 | 80 | 80 |  | 80 | 100 | 80 | 80 | 75 |  | 100 |  |  |  |  |  |  |  |
| [Li(f)]-[Li(c)], gat./l. × 10$^5$ | 5.5 | 6 | 8.5 | 11 | 16 | 21 | 31 | 41 | 42 | 44 | 5 | 10 | 15 | 25 | 25 | 40 | 25 | 40 |
| [Li(f)]-[Li(c)]-[B(f)], gat./l. × 10$^5$ | 0.5 | 1 | 1 | 1 | 1 | 1 | 1 | 1 | 2 | 4 | 1 | 4 | 3 | 12 | 17 | 14 | 25 | 40 |
| [B(f)]:([Li(f)]-[Li(c)]) | 0.91 | 0.83 | 0.88 | 0.91 | 0.94 | 0.95 | 0.97 | 0.98 | 0.95 | 0.91 | 0.80 | 0.60 | 0.80 | 0.52 | 0.32 | 0.65 | 0 | 0 |
| Polymerization temperature, °C | 60 | 60 | 60 | 60 | 60 | 60 | 60 | 60 | 60 | 40 | 60 | 40 | 40 | 40 | 40 | 40 | 40 | 40 |
| Polymerization time, min | 310 | 330 | 310 | 220 | 270 | 250 | 230 | 285 | 205 | 300 | 240 | 320 | 460 | 300 | 280 | 300 | 230 | 200 |
| Monomer conversion, percent | 71 | 84 | 80 | 75 | 80 | 80 | 59 | 71 | 86 | 71 | 85 | 81 | 85 | 94 | 92 | 95 | 94 | 94 |
| LVN* of the polymer dl./g | 8.0 | 7.8 | 5.4 | 4.4 | 3.4 | 3.2 | 2.1 | 1.9 | 2.4 | 1.95 | 9.0 | 4.6 | 3.7 | 2.9 | 3.0 | 2.3 | 3.0 | 2.2 |
| NMR cis-content of the polymer, percent | 92 | 94 | 92 | 91 | 90 | 88 | 87 | 85 | 82 | 80 | 92 | 86 | 87 | 80 | 78 | 77 | 76 | 73 |
| NMR trans-content of the polymer, percent | 4 | 3 | 4 | 5 | 6 | 8 | 9 | 11 | 13 | 15 | 4 | 10 | 9 | 15 | 17 | 18 | 19 | 22 |

*Limiting viscosity number determined in toluene at 25° C.

TABLE B

|  | According to the invention ||||||||||||| Not according to the invention ||||
|  | Preference |||||||||| No preference ||| With BR$_3$ || Without BR$_3$ ||
| Experiment number | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| [Li(f)]-[Li(c)], gat./l. ×10$^5$ | 5.5 | 6 | 8.5 | 11 | 16 | 21 | 31 | 41 | 42 | 44 | 5 | 10 | 15 | 25 | 25 | 40 | 25 | 40 |
| LVN of the polymer, dl./g | 8.0 | 7.8 | 5.4 | 4.4 | 3.4 | 3.2 | 2.1 | 1.9 | 2.4 | 1.95 | 9.0 | 4.6 | 3.7 | 2.9 | 3.0 | 2.3 | 3.0 | 2.2 |
| NMR cis-content of the polymer, percent | 92 | 94 | 92 | 91 | 90 | 88 | 87 | 85 | 82 | 80 | 92 | 86 | 87 | 80 | 78 | 77 | 76 | 73 |
| For comparison: |||||||||||||||||||
| NMR cis-content of polymer in— |||||||||||||||||||
| Acc. to invention but no preference—Exp. No.: |||||||||||||||||||
| 11, percent | 92 | 92 |  |  |  |  |  |  |  |  |  |  |  |  |  |  |  |  |
| 12, percent |  |  |  |  | 86 |  |  |  |  |  |  |  |  |  |  |  |  |  |
| 13, percent |  |  |  |  |  | 87 |  |  |  |  |  |  |  |  |  |  |  |  |
| Not acc. to the invention with BR$_3$—Exp. No.: |||||||||||||||||||
| 14, percent |  |  |  |  |  |  |  | 80 | 80 |  |  |  |  |  |  |  |  |  |
| 15, percent |  |  |  |  |  |  |  | 78 | 78 |  |  |  |  |  |  |  |  |  |
| 16, percent |  |  |  |  |  |  |  |  |  | 77 | 77 | 77 |  |  |  |  |  |  |
| Not acc. to the invention without BR$_3$—Exp. No.: |||||||||||||||||||
| 17, percent |  |  |  |  |  |  |  | 76 | 76 |  |  |  |  |  |  |  |  |  |
| 18, percent |  |  |  |  |  |  |  |  |  | 73 | 73 | 73 |  |  |  |  |  |  |
| NMR cis-content of the polymer, prepared without boron compound, but at the same value for [Li(f)]-[Li(c)], percent | 86 | 86 | 84 | 82 | 80 | 77 | 75 | 73 | 73 | 73 | 86 | 82 | 80 | 76 | 76 | 73 | 76 | 73 |

Table B shows: (1) that experiment 11 is approximately borderline with respect to the range of conditions which are preferably applied in the process according to the invention and that experiments 12 and 13 yield somewhat less favorable results than the comparable experiments 4 and 5, respectively: (2) that experiments 14 and 15 both give cis-contents which differ even more—in a negative sense—from the cis-contents of the comparable experiments 6 and 7 and that also the results of experiment 16 are considerably less favorable than those of experiments 8, 9 and 10, and (3) that the lowest cis-contents are obtained in experiments 17 and 18, while a comparison of these values with the cis-contents of experiment 6 or 7, or with those of experiment 8, 9 or 10 respectively, shows that here the mutual differences are greatest.

EXAMPLE II 200 ml. of a 1 molar solution of sec-butyllithium in isopentane was cooled to 0° C. under nitrogen in a separate reaction vessel. Subsequently, 1 liter of a 2-molar solution of isoprene in a mixture of alkanes and alkenes having 5 carbon atoms was slowly added with stirring. Consequently, the ratio [isoprene]:[s-BuLi] was 10. After all the isoprene had been converted into "living" polymer, 200 ml. of a 1-molar solution of BEt$_3$ in isooctane was added, with continued stirring, and the mixture thus obtained was diluted, again with stirring, with isooctane to a volume of 2 liters. Each liter of this solution contained 0.1 mole of the complex

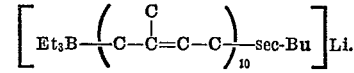

So the lithium concentration and the boron concentration in that solution were both 0.1 gat./l.

With the aid of this solution an isoprene polymerization was then carried out in the way as described in Example I. The autoclave mentioned in that example was again filled with the 20% w. isoprene feed being under its own vapor pressure, after which at 60° C. 0.40 mmole/l. of the complex prepared separately beforehand was added. After titration with a diluted sec-BuLi solution till the polymerization started, in which the consumption of sec-BuLi amounted to 0.03 mmole/l., an additional quantity of 0.01 mmole/l. of sec-BuLi was added. During the polymerization, in addition a quantity of 2×0.01 mmole/l. sec-BuLi was added to compensate for a decrease of the polymerization rate constant. After a polymerization time of 240 minutes the monomer conversion amounted to 75% and the polymerization was ended by addition of methanol. The resulting polymer proved to have a LVN of 1.6 dl./g., a NMR cis-content of 83% and a NMR trans-content of 13%.

Consequently, in this experiment:

[B(f)] = 40×10$^{-5}$ gat./l.
[Li(f)] = (40+3+1+2−3)×10$^{-5}$ = 43×10$^{-5}$ gat./l.
[Li(c)] = 2×10$^{-5}$ gat./l.
[Li(f)]-[Li(c)] = 41×10$^{-5}$ gat./l.
[Li(f)]-[Li(c)]-[B(f)] = (41−40)×10$^{-5}$ = 1×10$^{-5}$ gat./l. and
[B(f)]:([Li(f)]-[Li(c)]) = 40:41 = 0.98

Further the [Li(a)(f)] attained=the [Li(a)] aimed at=1.10$^{-5}$ gat./l. and consequently the compensation attained was 100%.

EXAMPLE III

The procedure of Example I was repeated at 60° C. with the aid of a BEt$_3$ concentration of 0.25 mmole/l. and a final concentration of sec-butyllithium of 0.30 mmole/l. (after subtraction of the concentration at initiation). During the polymerization 3×0.01 mmole/l. of sec-butyllithium was added to compensate for the reduction in polymerization rate. So

[B(f)]=25×10$^{-5}$ gat./l., [Li(f)]=30×10$^{-5}$ gat./l.
[Li(c)]=3×10$^{-5}$ gat./l.
[Li(f)]-[Li(c)]=27×10$^{-5}$ gat./l.
[Li(f)]-[Li(c)]-[B(f)]=2×10$^{-5}$ gat./l. and
[B(f)]:([Li(f)]-[Li(c)])=0.93

Further, in this experiment the [Li(a)(f)] attained= the [Li(a)] aimed at=1×10$^{-5}$ gat./l. and, consequently, the compensation was 100%. The polymerization was continued till a conversion of 78.5% had been reached. At that moment the living polymer, the LVN of which then amounted to 3.0 dl./g., was coupled by the addition of diethyl adipate. Of this compound so much was added that the ratio of lithium atoms in the living polymer to moles of diethyl adipate was 4:1.

One hour after the addition of diethyl adipate the LVN value of the polymer appeared to have increased to 4.8 dl./g. After addition of methanol the product was worked-up by addition of 0.5% w. (on polymer) of 4-hydroxymethyl-2,6-di-tert-butylphenol, steam-stripping and drying. The NMR cis-content was 86%, the NMR trans-content amounted to 10%.

EXAMPLE IV

The procedure of Example I was carried out at 60° C., except that the quantity of BEt$_3$ and the quantity of sec-butyllithium corresponding to [Li(f)]-[Li(c)] were added in two steps. The quantity of BEt$_3$ applied in the first step amounted to 0.012 mmole/l. Titration was carried out with quantities of 0.005 mmole/l. sec-BuLi per addition and continued till a temperature jump was observed. Subsequently an additional quantity of 0.006 mmole/l. of sec-BuLi was added. When a monomer conversion of 27% had been reached, step 2 was initiated by a second addition of BEt$_3$, now amounting to 0.42 mmole/l. This was followed again by titration, first with quantities of 0.02 mmole/l. and then with quantities of 0.005 mmole/l. per addition. Again, titration was continued till a temperature jump occurred, after which a further 0.01 mmole/l. excess of sec-BuLi was added. Neither during step 1, nor during step 2 a compensation was applied. The polymerization was continued till a monomer conversion of 86% had been reached. At that moment 0.055 mmole/l. of diethyl adipate was added to couple the living polymer; 15 minutes later 0.2 mmole/l. of methanol was added. Finally, the polymer was worked up by addition of 0.5% w. (on polymer) of 4-hydroxymethyl-2,6-di-tert-butylphenol, steam-stripping and drying. The end product had a NMR cis-content of 91%, a NMR trans-content of 5% and a LVN of 4.4 dl./g. The LVN of the polymer at the moment of addition of the coupling agent amounted to 4.0 dl./g.

In this experiment, during step 1:

[B(f$^1$)]=1.2×10$^{-5}$ gat./l.
[Li(f$^1$)]=1.8×10$^{-5}$ gat./l.
[Li(c$^1$)]=0 (so no compensation applied)
[Li(f$^1$)]-[Li(c$^1$)]=1.8×10$^{-5}$ gt./l.
[Li(f$^1$)]-[Li(c$^1$)]-[B(f$^1$)]=0.6×10$^{-5}$ gat./l.

$$[B(f^1)]:([Li(f^1)]-[Li(c^1)]) = \frac{1.2}{1.8} = 0.67$$

[Li(a)(f$^1$)] attained=[Li(a$^1$)] aimed at=0.6×10$^{-5}$ gat./l;
and during step 2:

[B(f)]=(1.2, 42)×10$^{-5}$=43.2×10$^{-5}$ gat./l.
[Li(f)]=(1.8, 42−0.6 l.)×10$^{-5}$=44.2×10$^{-5}$ gat./l.
[Li(c)]=0 (so no compensation applied)
[Li(f)]-[Li(c)]=44.2×10$^{-5}$ gt./l.
[Li(f)]-[Li(c)]-[B(f)]=1.0×10$^{-5}$ gat./l.

$$[B(f)]:([Li(f)]=[Li(c)]) = \frac{43.2}{44.2} = 0.98$$

[Li(a)(f)] attained=[Li(a)] aimed at=1×10$^{-5}$ gat./l.
So the ratio ([Li(f)]-[Li(c)]):([Li(f$^1$)]-[Li(c$^1$)]) was 44.2:1.8=24.6

EXAMPLE V

In a glass two-liter reactor three solution polymerizations of 1,3-butadiene were carried out successively (experiments I, II and III), using sec-BuLi as initiator. The diluent was a mixture consisting of 50% w. of cyclohexane and 50% w. of n-hexane. At the beginning of each polymerization the butadiene concentration was 15% w. In experiments I and II, which, according to the invention, were carried out with the aid of BEt$_3$ the polymerization was started according to the produre described in Example I. In experiment III, which served as the blank, no boron compound was applied.

The polymerization conditions and the results obtained are compiled in Table C. The microstructure of the polymer was determined by infrared analysis.

TABLE C

| Experiment number | I | II | III |
| --- | --- | --- | --- |
| [B(f)], gat./l.×1)$^5$ | 30 | 30 | 0 |
| [Li(f)], gat./l.×10$^5$ | 37 | 35 | 30 |
| [Li(c)], gat./l.×10$^5$ | 6×1 | 4×1 | 0 |
| [Li(a)] aimed at, gat./l.×10$^5$ | 1 | 1 | 30 |
| [Li(a)(f)] attained, gat./l.×10$^5$ | 0.5 | 0.75 | 30 |
| Attained compensation of permanently deactivated Li during polymerization, percent | 50 | 75 | — |
| [Li(f)]-[Li(c)], gat./l.×1)$^5$ | 31 | 31 | 30 |
| [Li(f)]-[Li(c)]-[B(f)], gat./l.×10$^5$ | 1 | 1 | 30 |
| [B(f)]:([Li(f)]-[Li(c)]) | 0.97 | 0.97 | 0 |
| Polymerization temperature, °C | 75 | 75 | 55 |
| Polymerization time, minutes | 165 | 215 | 50 |
| Monomer conversion, percent | 47 | 45 | 53 |
| LVN of the polymer, dl./g. | 2.2 | 2.2 | 2.1 |
| Cis-content of the polymer (infra-red analysis), percent | 64 | 61 | 42 |
| Trans-content of the Polymer (infra-red), percent | 29 | 32 | 49 |
| Vinyl-content of the polymer, (infra-red), percent | 7 | 7 | 9 |

What is claimed is:

1. A process for the polymerization of at least one conjugated diene, in the presence of a liquid hydrocarbon diluent selected from alkanes, monoalkenes and aromatics of 4 to 8 carbon atoms and mixtures of these, in which the polymer is formed in the dissolved state, using an initiator consisting essentially of a lithium alkyl compound having 4 to 8 carbon atoms (a) and a trihydrocarbylboron compound wherein the hydrocarbyl groups are of 2 to 6 carbon atoms (b) the latter compound, being completely soluble in said diluent in the concentration applied at the polymerization temperature, which process comprises contacting at temperatures of about 40 to 60° C. (a) and (b) with each other in the presence of at least one aliphatic conjugated diene having 4 to 6 carbon atoms and optionally a mono-vinylaromatic hydrocarbon having 8 to 12 carbon atoms, and the ratio of the boron concentration [B(f)] in gat./l. to the lithium concentration [Li(f)] in gat./l. is higher than 0.01 and lower than 1.00, these terms representing the concentrations in the reaction mixture at the end of the polymerization, but in the case of the lithium concentration reduced by the minimum lithium concentration that is needed in the reaction medium in the absence of a boron compound to initiate the polymerization and during polymerization after a monomer conversion of at least 10%, the boron concentration and the lithium concentration are each increased at least once, each addition of (b) being followed by addition of an equivalent quantity of (a), or by at least one addition of a pre-mixture prepared by reacting a quantity of (a) with a compound selected from aliphatic conjugated dienes having 4 to 6 carbon atoms and monovinyl arenes having 8 to 12 carbon atoms and then adding a quantity of (b) that is equivalent to the quantity applied of (a) with the provisos that:

(1) component (a) is completely soluble in the diluent in the total concentration applied at the polymerization temperature, and, (2) where [Li(c)] represents the increase of the lithium concentration applied to compensate to a maximum of 100% for the quantity of lithium that is permanently deactivated during the polymerization as a result of reaction with the contaminants present in the feed, the difference [Li(f)]-[Li(c)] lies between $10^{-5}$ and $10^{-1}$ gat./l., the difference [Li(f)]-[Li(c)]-[B(f)] has a value of from $0.5 \times 10^{-5}$ to $10 \times 10^{-5}$ gat./l., and the ratio [B(f)]:[Li(f)]-[Li(c)] is higher than 0.5.

2. A process according to claim 1, wherein the ratio [B(f)]:([Li(f)]-[Li(c)]) is higher than 0.8.

3. A process according to claim 1 wherein [Li(f)]-[Li(c)]-[B(f)] lies between $0.5 \times 10^{-5}$ and $5 \times 10^{-5}$ gat./l.

4. A process according to claim 1 wherein the polymerization is started by first contacting at least one monomer with a quantity of (b) and then adding a quantity of (a) which is greater than the quantity that is equivalent to the quantity of (b).

5. A process according to claim 1, wherein the increase of the boron concentration and the increase of the lithium concentration equivalent therewith take place only once and are effected at a monomer conversion between 10 and 60%, at ([Li(f)]-[Li(c)]):([Li(f$^1$)]-[Li(c$^1$)]) ratio of from 5 to 50, in which (f$^1$) and (c$^1$) indicate that the concentrations concerned only relate to the period before the concentration increase, but otherwise have the same meaning as (f) and (c).

References Cited
UNITED STATES PATENTS

| | | | |
|---|---|---|---|
| 3,278,508 | 10/1966 | Kahle et al. | 260—94.2 M X |
| 3,329,666 | 7/1967 | Stearns | 260—94.2 M |
| 3,526,604 | 9/1970 | Wodsworth | 260—94.2 M |
| 3,631,006 | 12/1971 | Hawkins | 260—94.2 M |
| 3,377,404 | 4/1968 | Zelmski | 260—94.2 M X |

JOSEPH L. SCHOFER, Primary Examiner

W. F. HAMROCK, Assistant Examiner

U.S. Cl X.R.

260—82.1